(12) United States Patent
Villarrubia Ruiz

(10) Patent No.: US 10,961,987 B2
(45) Date of Patent: Mar. 30, 2021

(54) SOLAR COLLECTOR AND TURBINE ARRANGEMENT

(76) Inventor: Jonas Villarrubia Ruiz, Madrid (ES)

( * ) Notice: Subject to any disclaimer, the term of this patent is extended or adjusted under 35 U.S.C. 154(b) by 0 days.

(21) Appl. No.: 13/988,459

(22) PCT Filed: Dec. 18, 2011

(86) PCT No.: PCT/ES2011/070876
§ 371 (c)(1),
(2), (4) Date: May 20, 2013

(87) PCT Pub. No.: WO2013/068607
PCT Pub. Date: May 16, 2013

(65) Prior Publication Data
US 2014/0298807 A1    Oct. 9, 2014

(51) Int. Cl.
*F03G 6/04* (2006.01)
*F03G 6/06* (2006.01)
*F02C 1/05* (2006.01)
*F02C 7/08* (2006.01)
*F24J 2/07* (2006.01)
(Continued)

(52) U.S. Cl.
CPC ............ *F03G 6/04* (2013.01); *F02C 1/05* (2013.01); *F02C 7/08* (2013.01); *F02C 7/24* (2013.01); *F03G 6/064* (2013.01); *F24J 2/07* (2013.01); *F03G 2006/062* (2013.01); *F05D 2250/232* (2013.01); *F24J 2/246* (2013.01); *F24J 2/247* (2013.01); *F24J 2/28* (2013.01); *Y02E 10/41* (2013.01); *Y02E 10/46* (2013.01)

(58) Field of Classification Search
CPC .... F03G 6/04; F03G 6/064; F02C 1/05; F02C 7/08; F02C 7/24; F24J 2/07; F24J 2/246; F24J 2/247; Y02E 10/46

USPC .......... 60/641.13, 641.14; 126/658, 666, 670, 126/676, 678
See application file for complete search history.

(56) References Cited

U.S. PATENT DOCUMENTS 2,552,237 A * 5/1951 Trombe ................... 126/651
4,081,965 A * 4/1978 deGeus ................. 60/641.15
(Continued)

*Primary Examiner* — Jesse Bogue
*Assistant Examiner* — Laert Dounis

(57) ABSTRACT

TURBINE WITH SOLAR COLLECTOR OR TURBO-CHARGER, which is designed to originate innovative turbine kinetic energy through solar irradiation, irradiated by heliostats, parabolic or possibly to function with other types of fuel when not no solar radiation. With a heat exchanger through which passes the residual thermal energy is achieved in a higher efficiency than conventional turbines. In this set of turbine exchanged, collector and collector, its components are located so that the drop of the thermal fluid is the minimum possible. The team has been solar collector incorporated a radial type where the sunlight is irradiated, which in the collector, the heated fluid flowing through it which comes from the compressor, through the heat exchanger, and that the empty on the blades of the turbine motor generating a kinetic energy of a mechanical element that needs a turning force or power generators. This system can be developed to produce electric power from 1 kW to 15 kW in parable and even over twenty megawatts radiated tower heliostats. At low power is designed for can use the sensor and the sensor turbine or a turbocharger. No water uses er, no pollution and low installation costs, very significantly given the simplicity and innovation of its components.

2 Claims, 6 Drawing Sheets

(51) Int. Cl.
*F02C 7/24* (2006.01)
*F24J 2/24* (2006.01)
*F24J 2/28* (2006.01)

(56) References Cited

U.S. PATENT DOCUMENTS

| | | | | |
|---|---|---|---|---|
| 4,081,967 | A | * | 4/1978 | deGeus .................... F02C 1/05 60/641.15 |
| 4,509,333 | A | * | 4/1985 | Nussdorfer et al. ............ 60/723 |
| 5,300,817 | A | * | 4/1994 | Baird ..................... F03D 9/007 290/1 R |
| 5,870,895 | A | * | 2/1999 | Fally ...................... F02C 1/105 60/669 |
| 6,668,555 | B1 | * | 12/2003 | Moriarty ..................... 60/641.8 |
| 2010/0223925 | A1 | * | 9/2010 | Masada et al. ............... 60/641.8 |

* cited by examiner

SOLAR COLLECTOR AND TURBINE ARRANGEMENT

A solar collector and turbine arrangement to be used and operated with flows of air heated by solar radiation, produced by a parabolic concentrator or by heliostats, the collector is also designed to provide a flow to the solar turbine using different fuels. The turbine is fed by the air flow received using an innovative radial collector giving its ducts the form of a cone or funnel receiving the sunshine or solar radiation, which depends on the power to be generated, in kilowatts. Under fifteen kilowatts, the collector radiation will for preference be with custom-designed parabolas to the area and thermal power of the focus, depending on the power to be produced, in kilowatts; while the kilowatt output may be raised with parabolas of greater area and diameter, above that power the ideal is for the air flowing through the collector and reaching the compressor to be heated by a given number of heliostats before being received by the drive turbine, with the collector, turbine and other components installed in a tower. This turbine represents an advance on existing types by modifying the thinking behind its mechanical functioning. While fossil fuels, hydrogen or fuels of biological origin (biomass compounds) might be supplied to the flow outlet to the drive turbine, should that be decided in the project including the turbine in this patent, ideally that flow should be heated by solar radiation. The turbine and collector model arising from this patent takes three forms, one in which the compressor is external, and another model where the compressor forms part of the turbine, but with the drive turbine flow facing the compressor, as detailed in the description of the drawings; in the third form, the turbine applied to the collector is substituted by a turbocompressor. In short, the assembly is formed in each of the above mentioned embodiments by an innovative configured solar collector, its ducts circular or square and in radial form in the shape of a cone or funnel and a turbine which, while adhering to the thinking of the Brayton thermodynamic cycle, alters the order of the components and includes a novel recuperator different from any currently in use. It must be pointed out that the turbine and collector can each independently operate with other types of collectors, and the collector with other types of thermodynamic elements, where they would be coupled for use, as explained, together or independently and separately.

On the other hand, given the novelty of the collector and its greater efficiency, for lower installations of one to 15 kilowatts, whether or not the turbine described in this patent is installed, to cheapen the resulting product, a turbocompressor may be fitted, substituting for the turbine, and with the particular feature that it is very economical and can be couple to this type of installation, as a novelty, with the new solar collector.

It should be noted that the mentioned collector could also be defined as a heat exchanger, but the term collector seems more accurate to the patent's overall description.

OBJECT OF THE INVENTION

The object of the invention is to obtain greater thermodynamic efficiency of the power output of the elements making up the equipment, to use solar radiation as the driving energy, avoiding water consumption in this type of facility, to make the installations more economical without losing efficiency, exploiting the temperature emerging at the gas outlet (hot air), and also able to employ part of the energy to produce hydrogen or, using means for the storage of salts or oils or high-temperature fluids to be used in a variety of ways to produce cold or steam in the case of use for steam turbines at times of zero solar radiation, as already explained by this inventor in his invention in the Spanish register in February 2006: U200600388, and in the European register, 07381002-0-1267 based on the priority of the former, or by night-time supply with another fuel type. It is a major object of this patent to make it possible to avoid pollution and associate electricity production with renewable energy use.

BACKGROUND OF THE INVENTION

Reference may be made as antecedents of this invention to various technologies already very familiar, such as gas turbines, steam turbines, heliostats and the collectors used for different thermo-solar steam projects, and with turbocompressors. Parabolas are familiar which are used for different take-up procedures or as transmitters of the radiation they receive, whether from one source or two. Using all that, and all the background to the various technologies described, major innovations have been made, and in the grouping of the components, necessary to obtain a model which is able to enhance and differentiate itself from existing ones and, in the opinion of the inventor of this patent, a better result.

Technical Problem to Resolve

There are a number of problems to be resolved: it is a characteristic of gas turbines that the fuels they use pollute the environment, plus the great costs arising from their enormous complexity and, within the possibilities furnished by thermodynamics, low energy efficiency result. These also include the high temperatures whose impact the project in this patent seeks and is able to reduce on the drive turbine and the other turbine components.

Another problem to be resolved is that the solar collectors are elements, in this type of project, that provide a very important basis for the final result of the energy consumed, as this conditions the need for high capacity to receive solar radiation with maximum benefit and deliver that heat to the fluid or flow sent to the mechanical elements, whether steam turbines, turbocompressors, gas turbines or other types of elements needed in this exchange between solar radiation and them.

DESCRIPTION OF THE INVENTION

The invention consists mainly of two elements forming one, or which are able to be used separately: the turbine or turbocompressor in low-wattage installations, and the collector, these breaking down into other components making up the whole. The collector is radial in shape, but its ducts sink, none overshadowing the following, as they turn toward the centre, exposing each duct to solar radiation and closing together so that the hot air inside does not escape through the unions as it is irradiated; it may have a transparent protective screen or it may not, depending on its position. The whole part around the outside of the collector not irradiated is filled with ceramic material which conserves the temperature of the collector ducts and, over this material, a layer of thermal insulation. Depending on the installation and its composition with the turbine, the opening on the outside of the collector, the part of greatest diameter, first exposed to the radiation can, as pointed out, at its flow input, be directed to an external compressor which furnishes the air flow to the ducting of the collector irradiated by the sun's rays reflected from a parabola (35) or from heliostats, and the ducts run to the outlet, the most internal part of the cone, or its tip, where it meets a straight, anti-turbulence duct of a length six times the width of the duct and, if necessary, with vanes inside to prevent the effect of turning or tornado at the entrance to the drive turbine, coinciding with the most internal cone output. If the assembly is formed with a turbine implicitly including the compressor, the collector entrance will run along a duct insulated from the outside to the compressor output. In both cases, the flow is heated by solar radiation in greater measure on the ducts inside the cone, as it returns to the collector and until reaching a very high temperature at its output, the flow temperature depending on the power needs in kilowatts required by the turbine installed. The collector, whose internal ducts are circular or square, but which may take any form to allow them to receive maximum solar radiation, includes the assembly mechanics necessary to allow the turbine to be fitted on or removed from it. In this case, as explained, the cone-shaped radial collector's interior fluid for heating may be air for the turbine in question described in this patent, or fluids of some other type as necessary to be heated by solar radiation: water, helium etc. to supply other types of mechanical generators.

The turbine divides into several components, but mainly the most important are described, indicating how they are used and operated: at the back—below or above, since the turbine can be installed in the position required but ultimately that connecting directly with the input of air absorbed by the compressor if installed—it would be advisable to install a filter to remove impurities from the incoming air due to the compressor's operation, the compressed air entering a component comprising two faces with an intermediate part. These faces, called "A" for that to the compressor and "B" for the drive turbine outflow, are perforated. The perforations of both, on the outside of their circumference, are connected by pipes, and it is through these narrow pipes that the compressed air must flow to the compressor, but insulated at the part where the drive turbine flow begins. The pipes cover the entire exterior circle. Face A only has openings and pipes on the outside, while the lower part of the Face A circle, inside and between the two faces, is closed, with no connection. Face B, leading to the drive turbine and its flow, has a projection that closes the connection of the ducts carrying the compressor air to the turbine flow collector. Following that close, Face B has openings on its inside radius linking the drive turbine air flow with the inside of the two faces, A and B, so that the air sent from the drive turbine at a very high temperature flows through those openings and, on its way to the gas output, these gases irradiate the heat they contain to the pipes where the air flows from the compressor to the collector, and these pipes to that compressed air, at the same time heating the closed part of Face A, leading to the air that is compressed and to the compressor and en route to the pipes where that air to the collector flows, so seeking to maximise the use of the hot air from the drive turbine. It is important to configure the pipes as a system for connecting the compressed air with the collector, and they may take any form provided that their bore and the number of ducts do not choke the air. The materials for Face A and B and the pipes and, in short, all the fixed or mobile mechanical elements must be of an alloy which supports high temperatures and expands very little, and highly resistant to corrosion on mixing the air components of the air—oxygen, etc.—with the alloy of the mechanical components. The shaft connecting the turbine and compressor incorporates a hermetic chamber where it runs through the exchanger made up of Face A and Face B. This hermetic part in the compressor part has vanes which deliver a certain amount of air, of calculated quantity, to cool the drive turbine which receives and does not draw that cool air received from the compressor and, with its internal vanes, sends it to the gas outlet. Notwithstanding the many parts the collector and turbine break down into, there are four linking their main components: The compressor chamber, connecting to the intermediate part, acting as heat exchanger and as hot gas outlet. The heat exchanger connected to the chamber covering the drive turbine, the drive chamber connected to the collector, and the latter. The kinetic movement generated by the drive turbine operates the compressor, and the same shaft drives the current generator. If a turbocompressor is used, the description of the use of the turbine can be adapted similarly to the turbocompressor.

If the compressor is external, of the screw or any other type, the drive turbine directly transmits its work to the generator, bypassing the compressor. In this case, two heat exchangers work to heat the fluid, one installed at the gas outlet and the other, connected to it, at the input of the air from the solar collector already described, this air reaching it from the external compressor. In everything described, the solar irradiation to the collector may use parabolic concentrators or mirrors, and the installation of the components of collector, turbine or turbocompressor, compressor and generator, in a tower or parabola.

BRIEF DESCRIPTION OF THE DRAWINGS

The figures in the drawings represent all the elements of this patent. Except for that of the turbocompressor, appearing in FIG. 02, FIG. 01 forms a complement of all the components together collector (1), the drive turbine (4), the heat exchanger pipes: inputs (24) and output (17) located on the route for the hot gas discharge (8), the collector outlet to the turbine (3) whose length must be approximately six times the pipe diameter, the last runner of collector (12) which is exposed to the highest solar radiation temperatures; heat-storage ceramic coating (13); outlet (19) openings on the internal face for the gases used and emerging from the drive turbine (4) and the cooling vanes (21) in drive turbine (4), of the cooling air reaching the vanes 22 of the compressor 16. Various injectors (30) are incorporated into the collector (1) to generate heat by the injection of gases producing flames and transmitting heat to the surrounding air arriving from the compressor (16).

The compressor (16) compresses the air and directs it to (24), the air input to the pipes (24) acting as heat exchanger when heated by the air on the way to the outlet (8), the air from compressor (16) entering through input (24) and exiting through its outlet from the pipes (17) running to collector (1) along channels (18) which are protected by insulation (23) from the outside air. The air compressed by compressor (16), heated by pipes (40) (in FIG. 05) acting as heat exchanger with input (24) and outlet (17) and in turn by the heating from the sealed wall (20), arrives along (18) to input (6) of collector (1). Collector (1) is irradiated by the solar radiation reflected by a parabola (35) or by heliostats, depending on the power to be applied to the network by generator (10), which is connected by the main shaft (9), joining drive turbine (4) to compressor (16) and generator (10). The irradiated compressed air reaches the last of its ducts (12) and emerges at outlet (3) from collector (1), pressing on and operating the drive turbine (4) which activates compressor (16) and generator (10). The whole collector (1), from outside to inside, is fitted with insulation (23) and under that insulation there is powder or ceramic ball (13) thermal storage intended to prevent fluctuations in the flow flooding the inside from input (6) to the collector (1) to its outlet (3).

FIG. 06 shows said assembly (36) installed in the centre of the parabola (35), but at the back. The solar radiation (38) is distributed by the parabola (35), concentrating it at a reflector (37) which sends that concentration to the centre of the parabola (35) where collector (1) is located. The entire complement of collector and other accessories can also be installed in the direct parabola focus, as FIG. 06 is merely a figurative representation of the possibilities of the installation in a parabola (35).

DESCRIPTION OF A PREFERRED EMBODIMENT

Figure 1:
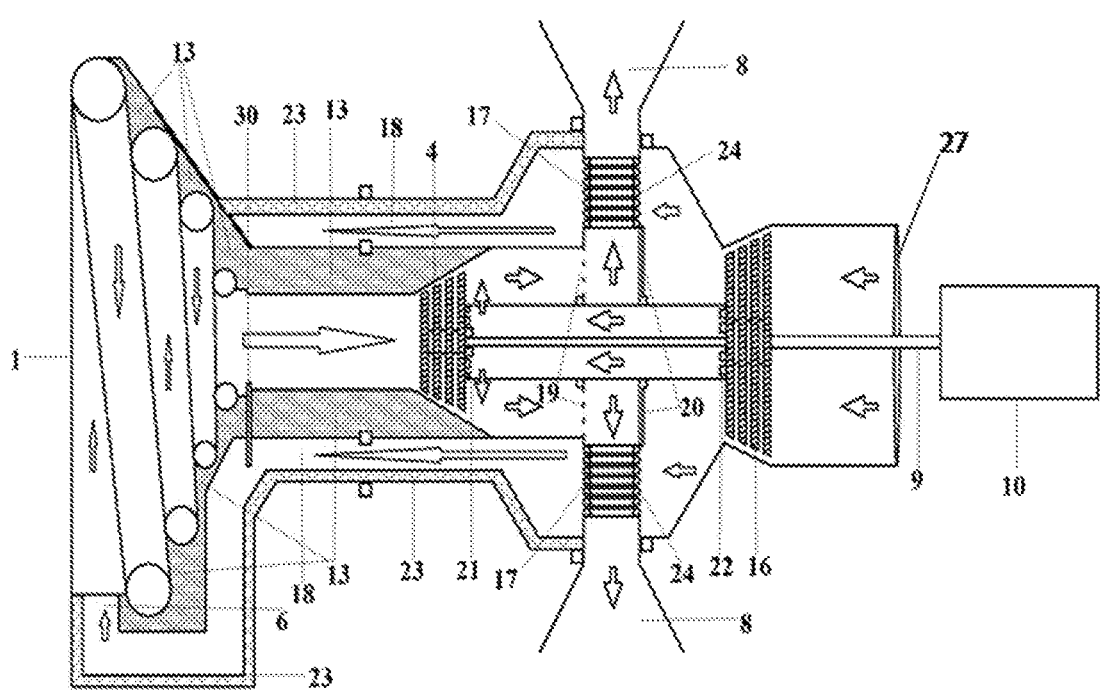
Figure 2:
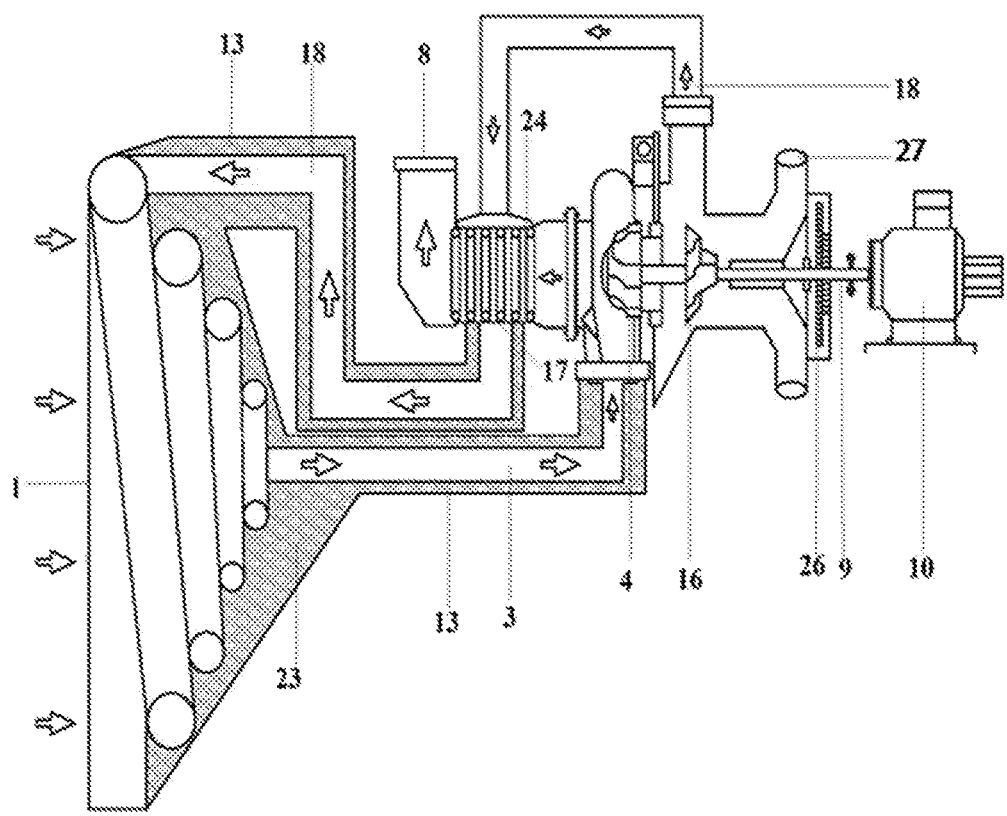
FIG. 02 shows the same circuit but now with turbine (4) and compressor 16 replaced by a turbocompressor: compressor (16) takes in air at (27), compressing it or directing it by (18) to exchanger (24) and, once heated, it is sent along (18) to the input to collector (1). The solar radiation, irradiated by a parabola or by heliostats delivered to collector (1) after overheating in its pipes, reaches (3), sending it to turbine (4), emerging crossing and heating to (24) and exiting at (8). The insulation and temperature accumulator (13), protects from the outside temperature and at the same time accumulates temperature to confront possible variations in the radiation. All this kinetic energy from turbine (4) is transferred along shaft (9) to the compressor (16), to the regulator (26) and from there to generator (10).
Figure 3:
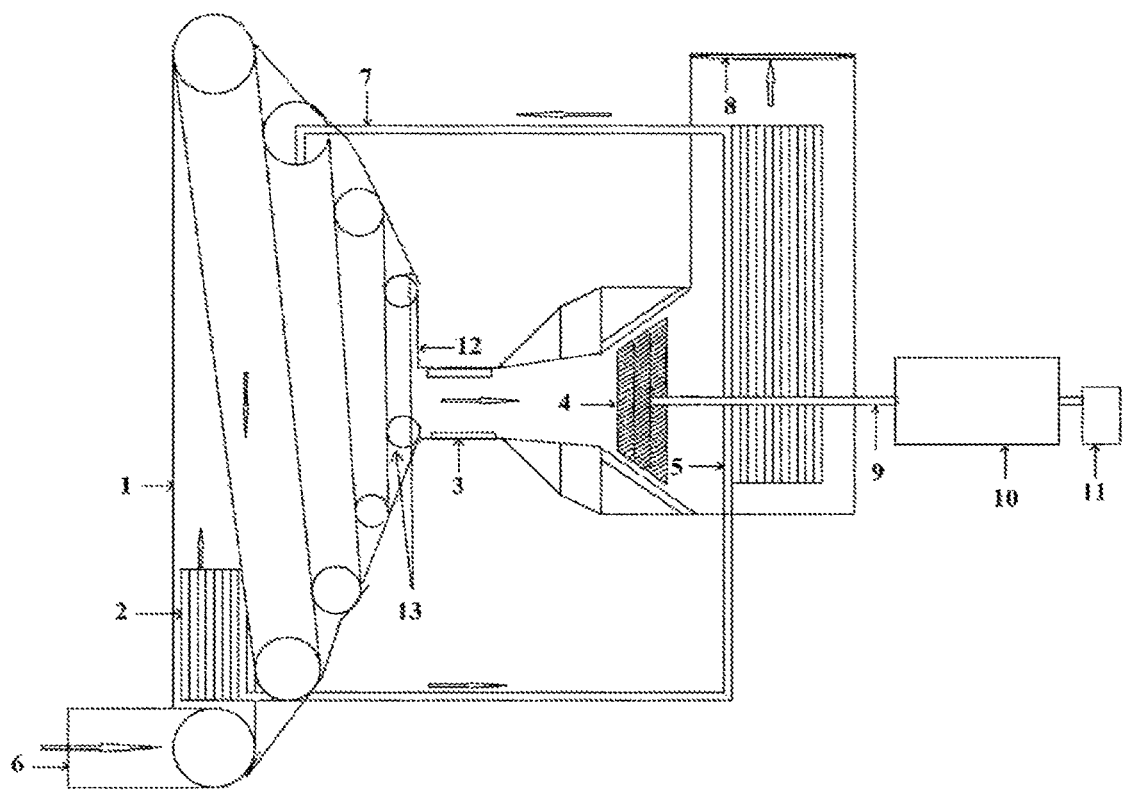
FIG. 03 is a model of the design in this patent where the compressor is an element separate from the whole, and is omitted. Collector (1) is where the compressed air arriving from an external compressor enters through input (6), flowing through a heat exchanger (2) and then on to the ducts of collector (1) which, as in the other figures, is radial in form, its ducts ending in a cone. The last turn (12) of collector (1) discharges into duct (3), fitted with anti-turbulence vanes, releasing the high-pressure, high-temperature flow to the drive turbine (4). The gases on the way to outlet (8) pass through a heat exchanger (5) which delivers the heat captured in the circulating flow along duct (7) and preferably inside collector (1) to avoid heat loss, sending it to the exchanger (2) at the input to collector (1). Along shaft (9), the drive turbine (4) applies its kinetic power to the compressor (10) and is connected via a clutch to starter (11).
Figure 4:
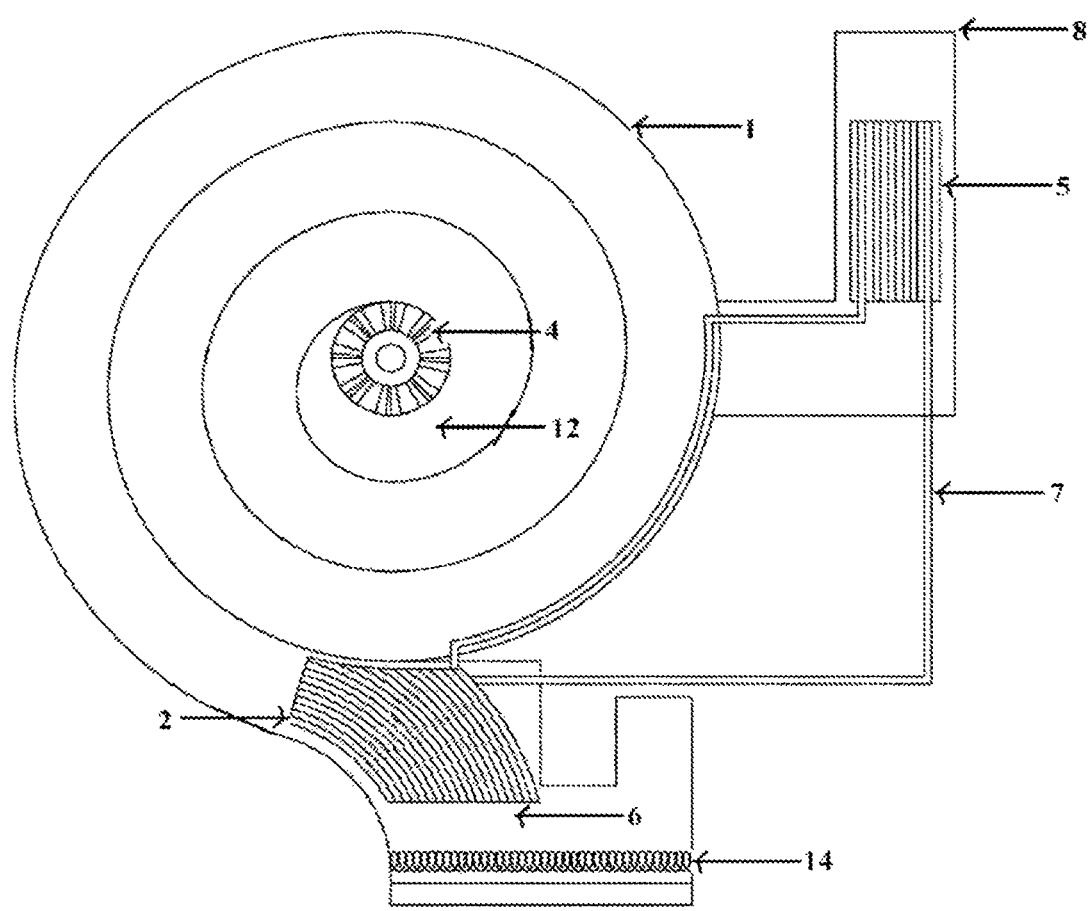
FIG. 04 shows collector (1) from the front, revealing its radial form and the last duct, the most internal (12) showing the drive turbine (4), even if it is not visible from this perspective. Here is radiator (2) to input (6) of collector (1), and figurative representation of a screw compressor (14): gas outlet (8), heat exchanger (5) on the way to the gas outlet, and duct (7) outside and inside collector 1.
Figure 5:
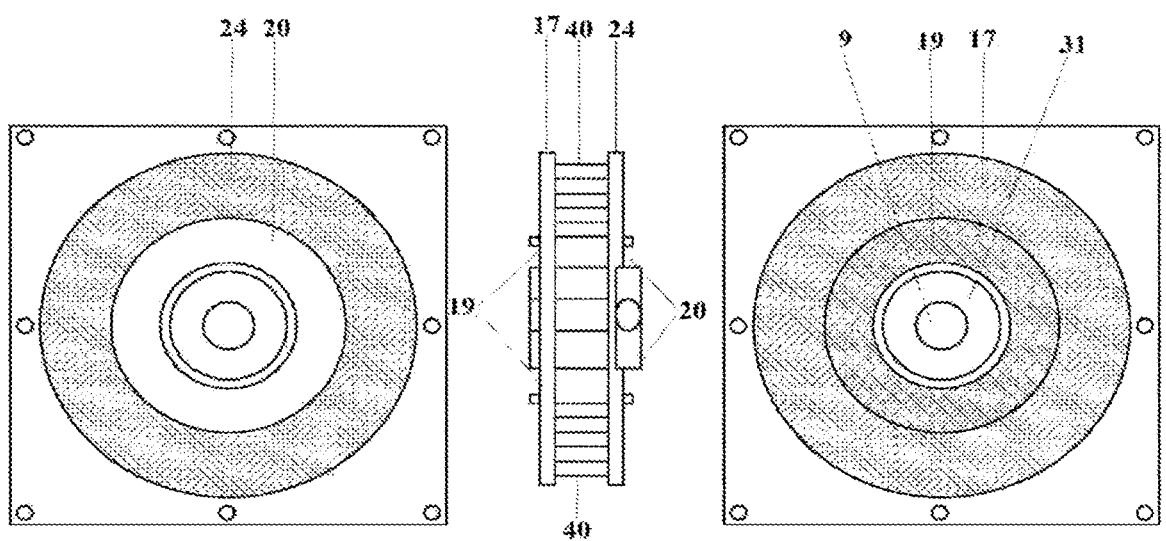
FIG. 05 shows in its centre the heat exchanger with pipes (40) and faces (24) and (17). Of sides (24) and (27), the former shows that the centre is blocked, the part leading to the compressor and on the outside the openings to the pipes (40) which emerge to face (17), directing the compressed air to the input to collector (1) in FIG. 01. Along the ducts (18). On face (17), the external openings are seen which are the outlet from the pipes carrying the air from the compressor (16) in FIG. 01 to collector (1); the openings (19) are also seen which open the way to the gases from drive turbine (4) on the path to outlet (8), both visible in FIG. 01, through the pipes (40). The turbine incorporates in the intermediate zone a central opening through which the shaft (9) is linked and passes, between a chamber which forms a duct (31) which is hermetic except because the compressor (16) has vanes (22) which send air from outside at ambient temperature to the vanes on the drive turbine (4) to cool them, and the central vanes (21) of the drive turbine expel the air where it mixes with that going to the outlet (8).
Figure 6:
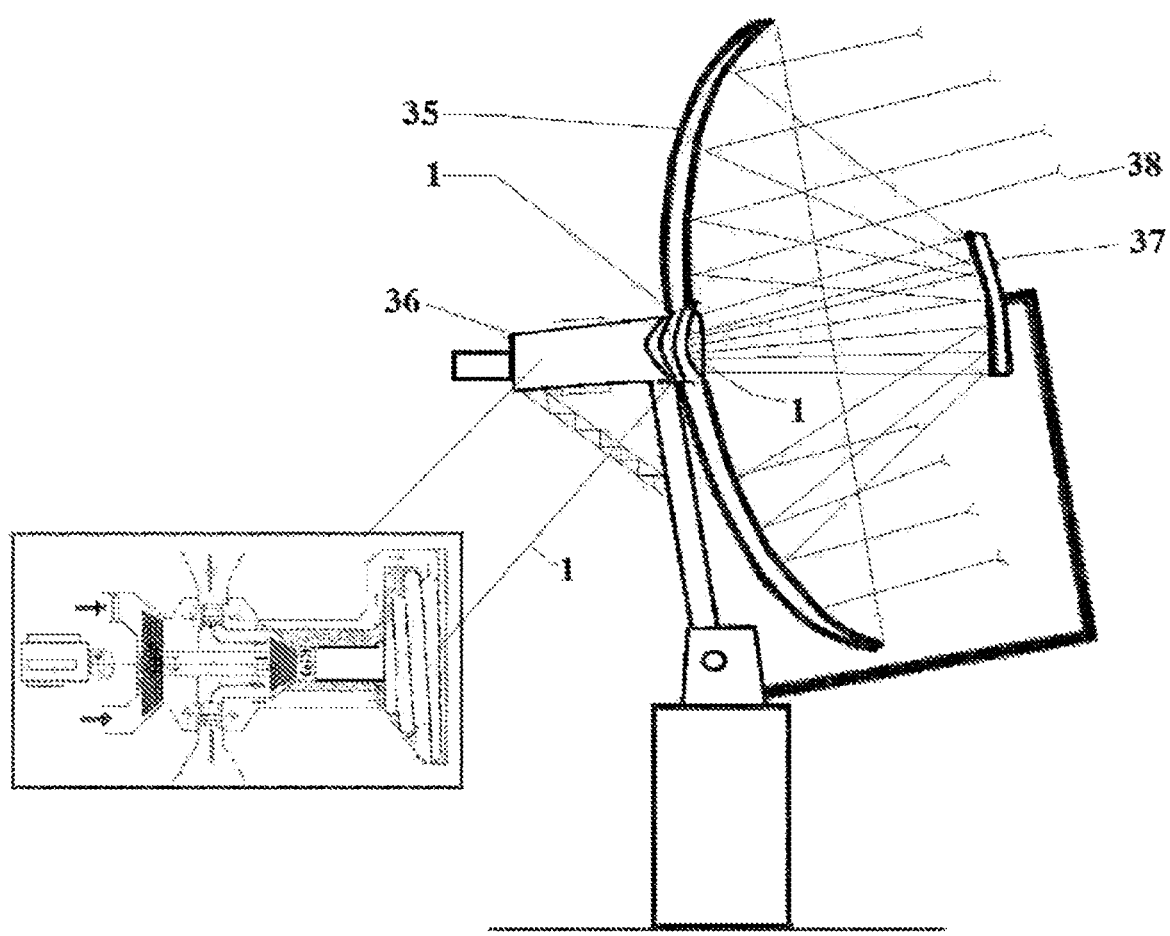
FIG. 06 illustrates once more how the assembly (36) of the collector (1) can be installed with everything forming part of the patent according to FIG. 01 or 02.

A preferred embodiment, in the case of this double project (compressor incorporated or external to the turbine shaft, with parabola (35) or tower), may take two forms: that installed in a solar tower, high enough so that a shadow is not cast in the radiation of the heliostats in their projection, or on a small scale, with the collector at the focus of radiation of a parabola. The former requires civil engineering work if it is to be able to house a platform at a certain height to carry a generator, turbine and collector. The collector must be made of pipes of material of just a few millimeters cross-section, whether square or circular, with high thermal transmissivity and great resistance to high temperatures, and that alloy must expand as little as possible, all to obtain the best transmission of the heat produced by solar radiation in the material where fluid must flow, the fluid being air in this project, in radial form, its spirals conforming a cone, each turn standing back but exposed to the radiation, and the diameter of each turn reducing until reaching the flow outlet where it connects the outlet to the drive turbine input, another duct running to the collector input, on the first turn, which must connect to the compressor outlet. The collector cone is inclined, so that the part of the radial goes to the heliostats, the point of greatest solar incidence being the last turn, coinciding with the link between collector and turbine. This will mean that the first outer turn of the radial collector will reach a high temperature, increasing on each turn as the outlet is neared, where it is trimmed and where the temperature may reach as much as 1200° C. The turbine is coupled to the collector, or else a turbocompressor, and this turbine or turbocompressor is designed as explained in the description of the invention to receive the air flow heated by the solar radiation and with the compressed air ducts connected to the collector input if the turbine incorporates the compressor whereas, in the case of the turbocompressor, the compressor is implicit in it. The gas outlet runs directly to the outlet of the tower carrying the plant, in principle ideally hollow so that when the hot gases, clean air, rise because of temperature change, they cause the air to circulate, cooling all the component elements. At the drive turbine outlet, following passage of the air through the pipes where the compressed air flows from compressor to collector, to benefit from the residual hot air, it is used in air/fluid heat exchangers—oils, salts etc.—to store them or to create heat in situ to produce power at times of zero insolation, or to generate hydrogen by steam, using part of the electricity generated at peak insolation times when the energy provided by the sun is greater. Radiation is by heliostats in tower installations, preferably of the sort where the focus can be targeted individually.

Another preferred embodiment uses the same components as the tower installation, at a much smaller scale, where the elements are installed on a parabola (35) where the collector is at the focal point of greatest incidence of solar radiation, following the mini-turbine and the DC or AC generator. Given the size and parabola diameter required for more than 15 kilowatts, and although other sizes might be used, it is suggested that the tower is the most suitable for a preferred installation if the electrical energy required is more than those fifteen kilowatts.

The invention claimed is:

1. A solar collector and turbine arrangement comprising:
a collector (1) for receiving solar radiation;
a motor turbine (4); and
a compressor (16); wherein:
said collector is a radial collector (1) of conical configuration having a conduit, the interior of which being of circular or square cross section, the conduit having a path following the conical form of the collector and forming a plurality of volutes or turnings; the conduit being arranged so that there is no gap between adjacent volutes or turnings of the conduit, the radially innermost volute or turning of the conduit being connected with the conduit (3) feeding the motor turbine (4), the radial collector having an inlet (6) for compressed air from the compressor (16);
the radial collector is protected by a cover which has an insulating layer (23) covering ducts (18) leading from the compressor (16) to the collector (1), wherein within the insulating layer (23) there is a layer of ceramic (13) which is solid, in powder form or in pieces and which stores heat;
said collector (1) further comprising nozzles (30) for generating heat energy by means of gas injection which produces flame and adds heat to the air coming from the compressor (16);
the motor turbine (4) is fed with flow heated by solar radiation in the collector (1), wherein the motor turbine (4) is connected to the collector (1) but independent from the latter, the motor turbine (4) being connected to a shaft (9) linking the compressor (16) and an alternator or generator (10);
the arrangement comprises a heat exchanger which separates the motor turbine (4) from the compressor (16), wherein the heat exchanger has two faces connected by tubes (40) respectively having an air outlet (17) and an air inlet (24), wherein these two faces have holes and a blind wall (20) that shuts off the air from the compressor and forces it to be led to the duct (18) through the tubes (40) from the inlets (24) to the outlets (17) thereof without contacting the area of the motor turbine (4);
the arrangement has an intermediate zone that divides the compressor (16) from the motor turbine (4), wherein holes (19) are present on the face of the heat exchanger which is in the motor turbine area at an inside diameter thereof, through said holes (19)
gas having passed through the motor turbine (4) flows in a direction to an outlet (8) and is cut off from the compressor area by the blind wall (20) and also from the heated air passing through the tubes (40) from the inlets (24) to the outlets (17) thereof;
the compressor (16) is configured to send the compressed air through the Inlets (24) and unpressurised air to the motor turbine (4) by means of fins (22) which form part of the central part of the compressor (16); and
a central passage is arranged in the intermediate zone, wherein the central passage communicates and passes along the shaft (9) between a chamber forming a duct (31), the duct being airtight except for the compressor (16) sending ambient air by means of the fins (22) towards the blades of the motor turbine (4), central fins (21) of the motor turbine (4) sending the air outside, where it mixes with air going to the outlet (8).

2. The solar collector and turbine arrangement according to claim 1 wherein:
the collector (1) for receiving solar radiation receives solar radiation from a parabola or heliostats, when installed in a tower;
the motor turbine (4) and compressor (16) are configured as a turbocharger; and
a gearbox (26) is mounted on the shaft (9) between the generator and the motor turbine (4).

* * * * *